US008551294B2

(12) United States Patent
Kelley

(10) Patent No.: US 8,551,294 B2
(45) Date of Patent: Oct. 8, 2013

(54) PYROLYSIS SYSTEM FOR PRODUCING ONE OR A COMBINATION OF A SOLID, LIQUID AND GASEOUS FUEL

(75) Inventor: Carl D. Kelley, Fort Wayne, IN (US)

(73) Assignee: Feather N Time Corporation, Fort Wayne, IN (US)

( * ) Notice: Subject to any disclaimer, the term of this patent is extended or adjusted under 35 U.S.C. 154(b) by 770 days.

(21) Appl. No.: 12/579,986

(22) Filed: Oct. 15, 2009

(65) Prior Publication Data

US 2011/0089015 A1 Apr. 21, 2011

(51) Int. Cl.
*C10B 7/10* (2006.01)
(52) U.S. Cl.
USPC ............ 202/117; 202/118; 202/247; 202/251
(58) Field of Classification Search
USPC ..................... 202/96, 105, 117, 118, 247, 251
See application file for complete search history.

(56) References Cited

U.S. PATENT DOCUMENTS

| 1,534,737 | A | * | 4/1925 | Reed ............................... 432/18 |
| 4,126,519 | A | * | 11/1978 | Murray ........................... 201/32 |
| 5,017,269 | A | * | 5/1991 | Loomans et al. ................ 201/25 |
| 5,705,035 | A | * | 1/1998 | Avetisian et al. ................. 201/3 |
| 5,756,871 | A | * | 5/1998 | Wang ............................... 585/241 |
| 7,329,239 | B2 | * | 2/2008 | Safabash et al. ............... 604/136 |
| 8,318,997 | B2 | * | 11/2012 | Mcalister ....................... 585/240 |
| 8,328,993 | B2 | * | 12/2012 | Feerer et al. ................... 202/118 |
| 2006/0280669 | A1 | * | 12/2006 | Jones ........................ 423/445 R |
| 2009/0107830 | A1 | * | 4/2009 | Gehring et al. ................. 202/99 |

* cited by examiner

*Primary Examiner* — Nina Bhat
(74) *Attorney, Agent, or Firm* — Barnes & Thornburg LLP

(57) ABSTRACT

A pyrolysis system includes a source of feed material having carbon and unit rests upon a support surface and has a feed material inlet coupled by the feed material transport system to the source of feed material. The pyrolysis unit defines therein a reaction chamber having a length and having the feed material inlet defined at one end thereof. The reaction chamber defines a material flow axis in the reaction chamber from the feed material inlet along its length that is oriented one of parallel to and at an acute angle relative to the support surface. The pyrolysis unit defines at least one outlet for extraction of at the least one of a solid, gaseous and liquid fuel from the reaction chamber.

20 Claims, 8 Drawing Sheets

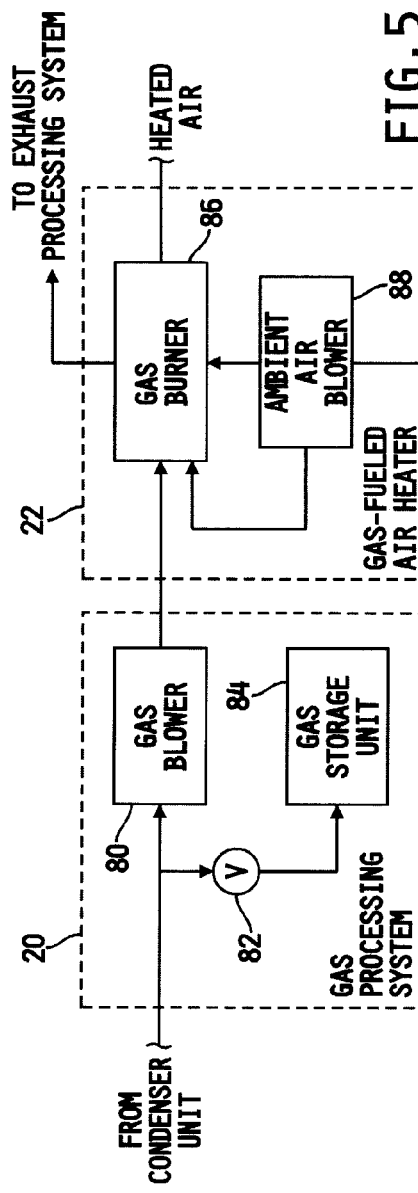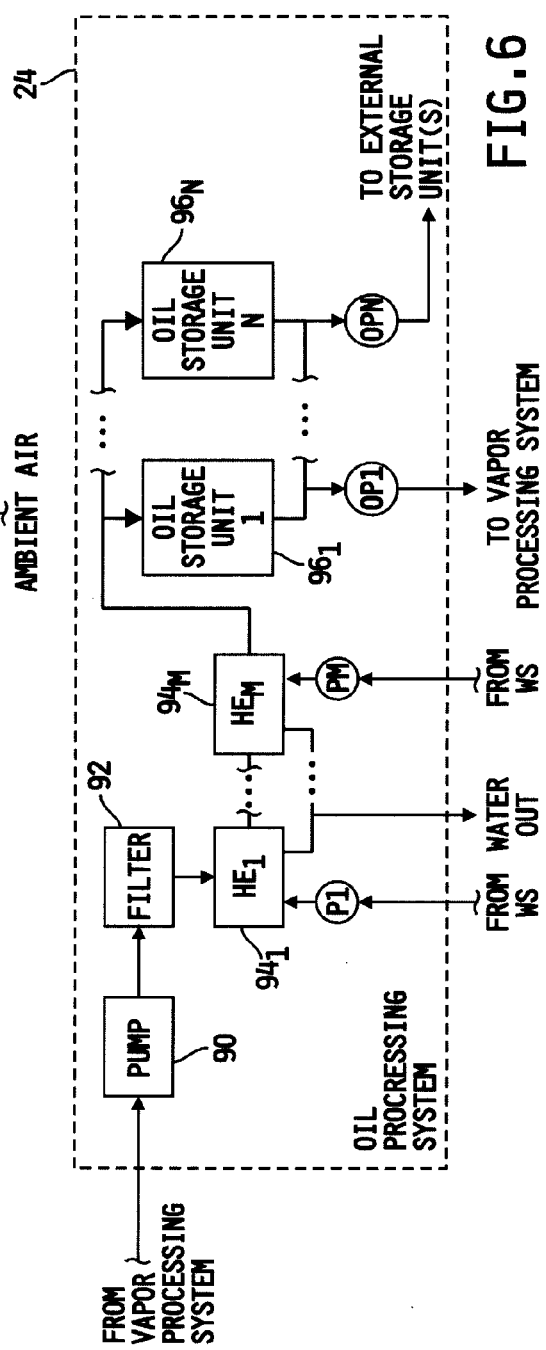

PYROLYSIS SYSTEM FOR PRODUCING ONE OR A COMBINATION OF A SOLID, LIQUID AND GASEOUS FUEL

FIELD OF THE INVENTION

The present invention relates generally to pyrolysis systems, and more specifically to such systems for producing one or a combination of a solid, liquid and gaseous fuel.

BACKGROUND

Pyrolysis systems are generally known and have been used to produce fuel in the form of one or a combination of gas, oil and charcoal. It is desirable to provide improvements to pyrolysis systems and/or pyrolysis processes in order to improve the efficiency and/or effectiveness thereof, and/or to optimize the yield of any one or combination of gas, oil and charcoal fuel.

SUMMARY

The present invention may comprise one or more of the features recited in the attached claims, and/or one or more of the following features and combinations thereof. A pyrolysis system may include a source of feed material having carbon and hydrogen bonds, a feed material transport system and a pyrolysis unit. The pyrolysis unit may be configured to rest upon a support surface and having a feed material inlet coupled by the feed material transport system to the source of feed material. The pyrolysis unit may define therein a reaction chamber having a length and having the feed material inlet defined at one end thereof. The reaction chamber may define a material flow axis in the reaction chamber from the feed material inlet along its length that is oriented one of parallel to and at an acute angle relative to the support surface. The pyrolysis unit may define at least one outlet for extraction of at the least one of a solid, gaseous and liquid fuel from the reaction chamber.

BRIEF DESCRIPTION OF THE DRAWINGS

FIG. 5 is a block diagram of one illustrative embodiment of the gas processing system and the gas-fueled air heater illustrated in FIG. 1.

FIG. 6 is a block diagram of one illustrative embodiment of the oil processing system illustrated in FIG. 1.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
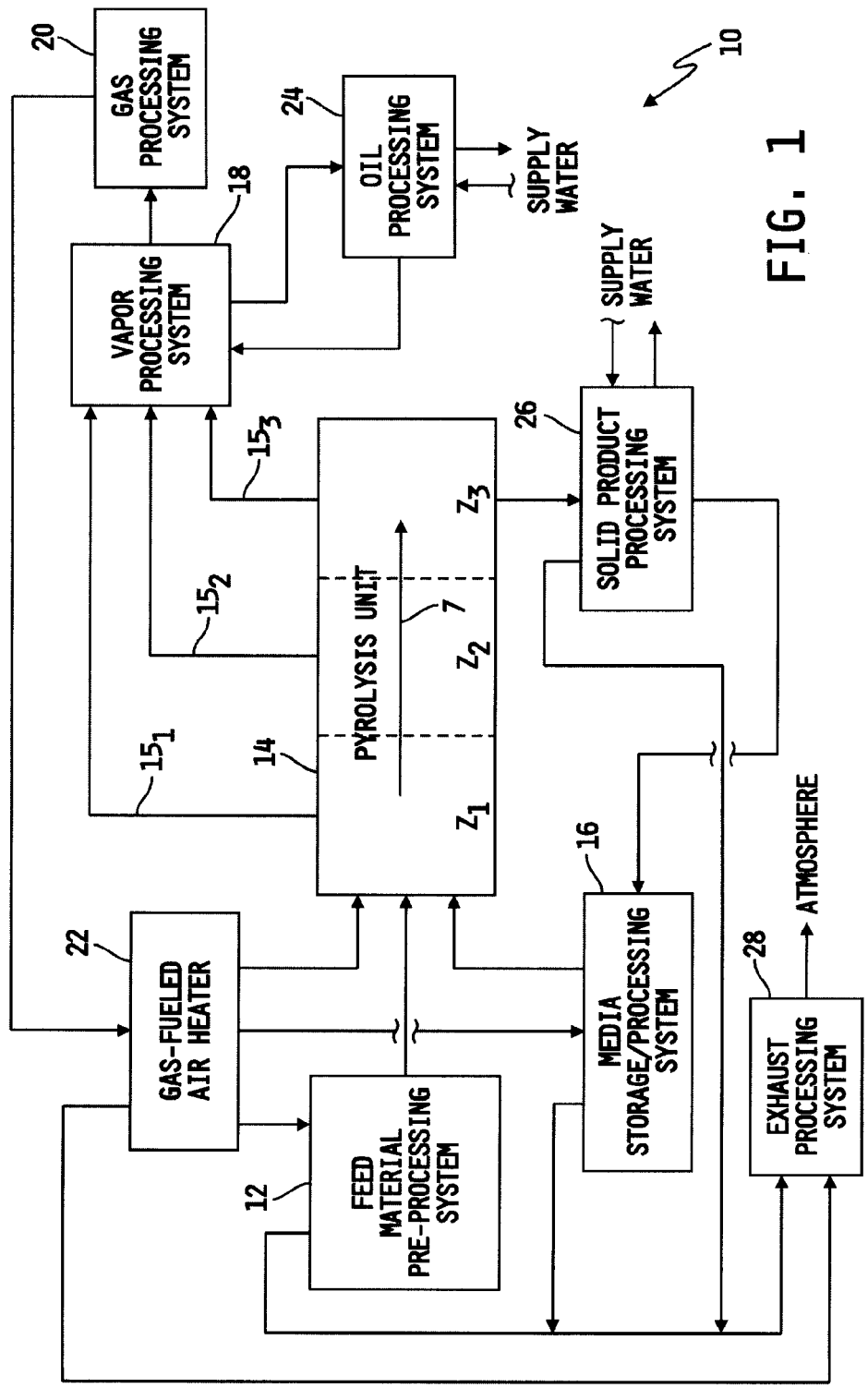
FIG. 1 is a block diagram of one illustrative embodiment of a pyrolysis system for producing one or a combination of a solid, liquid and gaseous fuel.

Referring now to FIG. 1, a block diagram of one illustrative embodiment of a pyrolysis system 10 for producing one or a combination of a solid, liquid and gaseous bio-fuel is shown. The term pyrolysis, as used herein, generally refers to a process by which a substance is chemically decomposed primarily by heat. In the embodiments illustrated herein, the substance undergoing pyrolysis will be referred to as a feed material that is or includes one or more substances having carbon and hydrogen bonds. One subclass of such feed material may include, for example, but should not be limited to, biomass, which refers to living and/or recently dead biological material. It will be understood, however, that this disclosure contemplates embodiments in which the feed material includes one or more other substances not having carbon and hydrogen bonds.

Examples of feed material that may be used in the pyrolysis system 10 include, but should not be limited to, wood, wood chips, sawdust, bark, demolition debris, plastics, manures, paper, rubber, auto-shredder residue and shredder fluff, minicipal solid waste, sewage, sludge, agricultural residue, peat moss, tires, conveyor belting, carpet, food waste, greases, oils, waxes, animal bedding, rendering residues, plant material, lingo-celllulosic materials, weeds, dried distiller grains (with or without solubles), waste grain, waste seed, spoiled or unspoiled bio-material, refinery "bottoms" or sludge, asphalt shingles, asphalt, construction and demolition waste, non-toxic chemical residues, medical wastes, bagasse, offal, and land clearing residue. In one illustrative embodiment, the feed material may be sized between, for example, 0.001-1.0 inches, although larger or smaller feed material sizes are contemplated by this disclosure. In any case, the product of pyrolysis is fuel which may be provided by a pyrolysis system in the form of one or any combination of gas, oil, and charcoal.

In the embodiment illustrated in FIG. 1, the pyrolysis system 10 includes a feed material pre-processing system 12 that generally receives feed material from an external source and pre-heats the feed material before supplying it to a pyrolysis unit 14. As will be described in greater detail hereinafter, the pyrolysis unit 14 is illustratively a horizontal pyrolysis system in that the axis or direction of material flow through the pyrolysis unit 14 is generally non-perpendicular to the support surface upon which the pyrolysis system 14 rests. In one illustrative embodiment, as illustrated in FIG. 1 for example, the axis or direction 17 of material flow through the pyrolysis unit 14 is horizontal, i.e., generally parallel to the support surface upon which the pyrolysis system 14 rests, although this disclosure contemplates alternative embodiments in which the axis or direction of material flow through the pyrolysis unit 14 forms an acute angle with the surface upon which the pyrolysis system 14 rests.

As will also be described in greater detail hereinafter, the pyrolysis unit 14 defines a number, L, of sequential zones along the length and material flow axis of the pyrolysis unit 14, wherein L may be any positive integer. Each of the L zones defines a gas or vapor outlet port from which gas or vapor may be extracted from the pyrolysis unit 14. In the embodiment illustrated in FIG. 1, for example, the pyrolysis unit 14 defines three sequential zones, $Z_1$-$Z_3$, along its length and material flow axis 17, although this disclosure contemplates embodiments in which the pyrolysis unit 14 includes more or fewer such zones. In any case, each zone, $Z_1$-$Z_3$, defines a separate gas or vapor port to which a corresponding gas or vapor transport line $15_1$-$15_3$ is coupled. The feed material is illustratively forced into and through the pyrolysis unit 14 in the direction 17 so that the material flows within the pyrolysis unit 14 from the feed material inlet at one end of the pyrolysis unit 14 toward the opposite end of the pyrolysis unit 14, and gas/vapor can be selectively removed from the pyrolysis unit 14 at various points along the material flow path via the gas/vapor transport lines $15_1$-$15_3$.

Although not illustrated in FIG. 1, the pyrolysis unit 14 further includes a material backflow apparatus in the form of a material agitator configured to controllably impede the flow of material through the unit 14 in the direction 17. Illustratively, the material agitator is provided in the form of one or more rotatable shafts having a number of mixing members extending therefrom. In this embodiment, the shafts illustratively have a rotational speed that can be controlled to control the dwell time of the material in any one or more of the zones. Illustratively, as will be described in greater detail hereinafter, the material backflow apparatus is further configured to inject heated air uniformly into the material along the length and material flow axis of the pyrolysis unit 14. Illustratively, the lining of the reaction chamber of the pyrolysis unit 14 is also heated by the heated air. The temperature of the material moving through the pyrolysis unit 14 may thus be controlled overall and/or within any one or more of the zones to provide for further control of the pyrolysis process. The pyrolysis unit 14 will be illustrated and described herein as illustratively including the features of continuous flow of feed material into the pyrolysis unit, a generally horizontal material flow axis or direction, multiple sequential zones and corresponding gas/vapor extraction ports/lines, a material backflow apparatus and a mechanism for injecting heat (e.g., heated air) uniformly into the material along the length and material flow axis of the pyrolysis unit 14 and for heating the reactor lining of the pyrolysis unit 14. It will be understood, however, that this disclosure contemplates alternative embodiments in which the pyrolysis unit 14 includes only one such feature or sub-combination of two or more such features. It will further be understood that while only one pyrolysis unit 14 is illustrated in FIG. 1, the pyrolysis system 10 may alternatively include any number of pyrolysis units.

The pyrolysis system 10 further includes a media storage/processing system 16 having a media outlet that is coupled to an inlet of the pyrolysis unit 14. The media contained within the media storage/processing system 16 is provided by the system 16 to the pyrolysis unit 14 generally at or near the inlet of the feed material into the pyrolysis unit 14. Illustratively, the media may be or include, but should not be limited to, one or more of iron, cobalt, nickel, silicon, zirconium, oxides of any of the foregoing media examples, and steel. The particular medium or combination of media selected will generally depend upon the composition of the feed material and desired chemical reaction with such media, and/or on the mechanism or mechanisms used to recover, at least in part, the media from the solid product resulting from the pyrolysis process. For example, one or more of the above-described media may be used to further a conventional Fischer-Tropch catalytic reaction within, or subsequent to, the pyrolysis unit 14. The media is illustratively ablative so that it breaks down or reduces the feed material in the pyrolysis unit 14 as the material is agitated and mixed therein. In one illustrative embodiment, the media may be sized between, for example, 0.001-1.0 inches, although larger or smaller media sizes are contemplated by this disclosure. The bulk density of the media may be selected as a function of the feed material composition and/or media composition. The feed material is illustratively introduced into the pyrolysis unit 14 at approximately 1%-11% by mass of the combination media and feed material, although this disclosure contemplates alternate embodiments in which the ratio or percentage of feed material to total material mass is greater or lesser.

The pyrolysis system 10 further includes a vapor processing system 18 that is configured to receive vapor/gas from at least one or any combination of the one or more zones of the pyrolysis unit 14 in embodiments in which it is desirable to extract gas and/or oil resulting from the pyrolysis process within the pyrolysis unit 14. In such embodiments, the vapor processing system 18 is configured to process the vapor/gas extracted from the pyrolysis unit 14, and to separate the gas component, e.g., hydrogen, from any liquid component, e.g., oil. The gas component is then supplied to a gas processing system 20 and the oil component is supplied to an oil processing system 24. In the illustrated embodiment, as will be described in greater detail hereinafter, the oil processing system 24 includes a supply water inlet and a supply water outlet for cooling the extracted oil, and at least some of the extracted oil is recirculated back to the vapor processing system 18, e.g., during startup of the vapor processing system 18, to assist in the operation thereof.

The pyrolysis system 10 illustrated in FIG. 1 further includes a gas-fueled air heater 22 that is configured to supply heated air to a number of different systems of the pyrolysis system 10. In the illustrated embodiment, the gas required to fuel the air heater 22 is retrieved from the gas processing system 20, e.g., hydrogen. In embodiments in which greater gas fuel recovery from the pyrolysis unit 14 is desired, the gas fuel provided to the gas-fueled air heater 22 may be provided by or supplemented by gas from an external source. In any case, heated air from the gas-fueled air heater 22 is illustratively supplied to the feed material pre-processing system 12, the pyrolysis unit 14 and to the media storage/processing system 16. In one illustrative embodiment, the gas-fueled air heater 22 is configured to supply heated air at approximately 1100 degrees C., although this disclosure contemplates embodiments in which the heated air supplied by the gas-fueled air heater 22 is greater than or less than 1100 degrees C.

The pyrolysis system 10 further includes a solid product processing system 26 that is configured to receive solid material from a solid material outlet of the pyrolysis unit 14 in embodiments in which it is desirable to extract solid material resulting from the pyrolysis process within the pyrolysis unit 14. In such embodiments, the solid processing system 18 is configured to process the solid material extracted from the pyrolysis unit 14, and to separate the solid fuel component, e.g., charcoal or char, from any waste component, e.g., ash. In the illustrated embodiment, as will be described in greater detail hereinafter, the solid processing system 26 includes a supply water inlet and a supply water outlet for cooling the extracted solid material, and at least some of the media in the extracted solid material is rerouted back to the media storage/processing system 16 for reuse.

The pyrolysis system 10 further includes an exhaust processing system 28 that receives exhaust gas from various systems within the pyrolysis system 10 and cleans such exhaust gas before release into the atmosphere.

Figure 2:
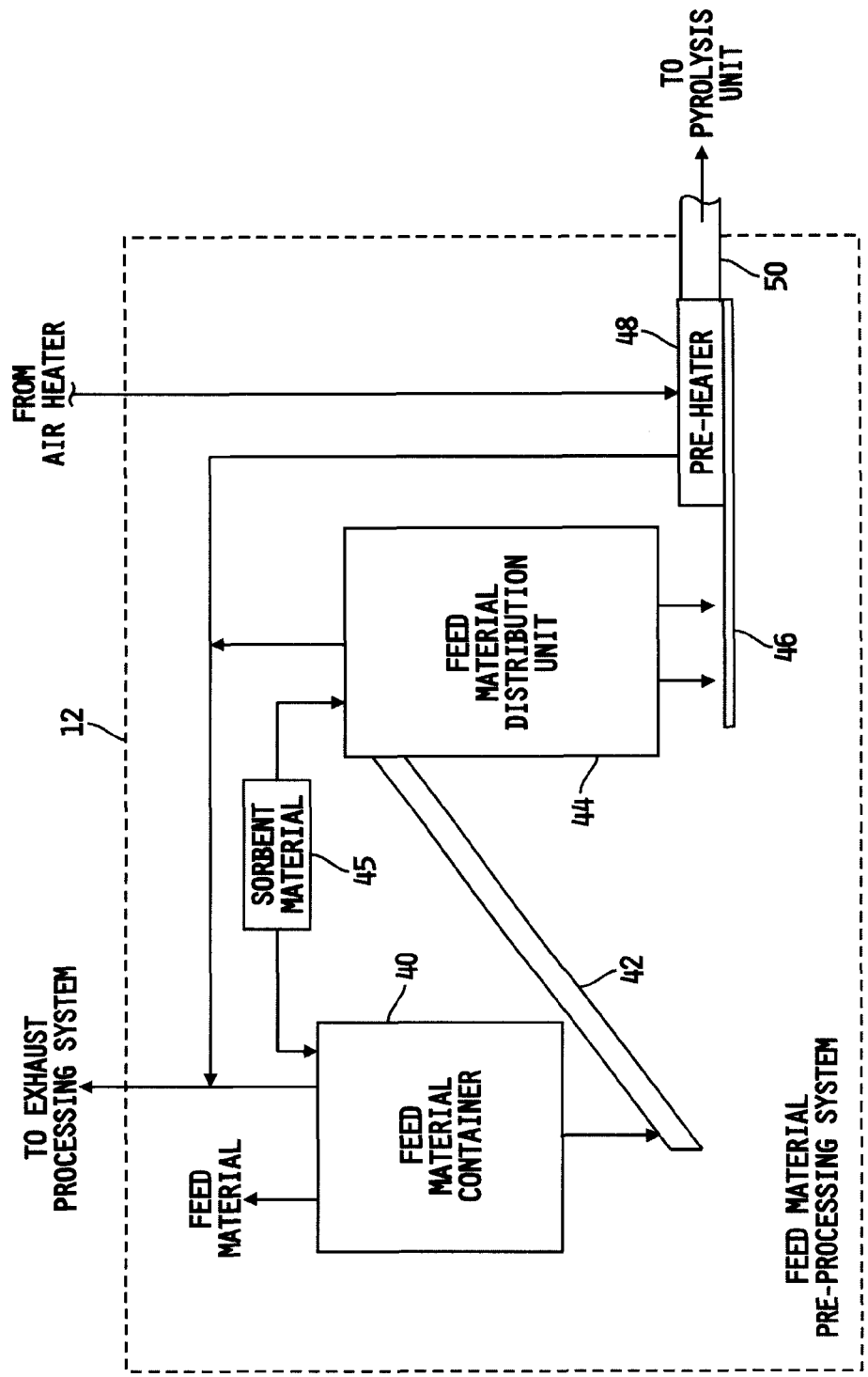
FIG. 2 is a block diagram of one illustrative embodiment of the feed material pre-processing system illustrated in FIG. 1.

Referring now to FIG. 2, a bock diagram is shown of one illustrative embodiment of the feed material pre-processing system 12 illustrated in FIG. 1. In the illustrated embodiment, the system 12 includes a feed material container or bin 40 that is configured to receive the feed material at or near a top end thereof and to discharge the feed material from the bottom end thereof. The feed material is illustratively deposited in the feed material container 40 from an external source manually and/or via a suitable feed material transport device, e.g., tractor, front-end loader or other suitable vehicle. Alternatively, the system 12 may include an automated system configured to supply the feed material to the feed material container 40 from one or more sources of feed material. In any case, a conventional auger 42 has an inlet positioned to receive the feed material from the bottom of the feed material container 40 and an outlet positioned at or near a top of a feed material distribution unit 44. The auger 42 is configured to transport feed material exiting the bottom of the feed material container 42 to or near the top of the feed material distribution unit 44, and to deposit the transported feed material into the feed material distribution unit 44. The feed material distribution unit 44 is configured to supply the feed material from a bottom end thereof to a conventional conveyor transport 46. In one illustrative embodiment, the feed material distribution unit 44 includes one or more separating structures configured to contact and at least partially separate or reduce clumping of the feed material moving from the top of the feed material distribution unit 44 to the bottom thereof. For example, the one or more separating structures may include a number of non-moving tines that extend into the interior of the feed material distribution unit 44. Alternatively or additionally, the one or more separating structures may be movable and thus provide for at least some amount of agitation or mixing of the feed material passing through the feed material distribution unit 44.

A sorbent material in the form of a single chemical or composition of one or more chemicals may be added to either or both of the feed material container 40 and the feed material distribution unit 44 from a sorbent material source 45. The sorbent material may be introduced into the feed material container 40 and/or feed material distribution unit 44 for the purpose of sequestering and/or absorbing one or more acid gas precursors. Examples of such one or more acid gas precursors include, but should not be limited to, sulfur, halogen and highly reactive metallic oxides. Examples of sorbent materials that may be used include, but should not be limited to, dolomite, calcium carbonate, hydrated dolomitic-lime, activated charcoal, and the like. The particle size of any such sorbent material will generally be selected and/or varied to achieve desired conversion and/or sequestration goals as a function of the composition of the feed material.

The conveyor 46 transports the feed material exiting the feed material distribution unit 44 to and through a feed material pre-heating unit 48 which is configured to receive a flow of heated air from the gas-fueled air heater 22. In one illustrative embodiment, the pre-heater 48 is controlled to approximately 350 degrees C., although alternative embodiments are contemplated in which the pre-heater 48 is, or multiple pre-heaters are, controlled to higher or lower temperatures. In other embodiments, the pre-heater 48 may be alternatively or additionally heated using other conventional heat sources.

Illustratively, the pre-heater 48 is provided to control the humidity, i.e., moisture content, of the feed material prior to introduction into the pyrolysis unit 14. In one illustrative embodiment, for example, the temperature of the pre-heater 48 and/or speed of the conveyor 46 is controlled to achieve moisture levels in the feed material entering the pyrolysis unit 14 of between 2% and 20% relative humidity, although alternative embodiments are contemplated by this disclosure in which the moisture level of the feed material entering the pyrolysis unit is controlled by the temperature of the pre-heater 48 and/or speed of the conveyor 46 to a lesser or greater relatively humidity level.

Feed material exiting the pre-heater 48 is supplied to the feed material inlet of the pyrolysis unit 14 by a conventional auger 50. In one illustrative embodiment, material flow through the pyrolysis unit 14 in the direction 17 (FIG. 1) is controlled by the action of the auger 50, and in this embodiment the auger 50 is a conventional stuffer auger configured to force feed material into the pyrolysis unit 14 generally according to a plug flow model. Alternatively, the feed material pre-processing system 12 and/or pyrolysis unit 14 may include one or more alternative or additional mechanisms for controlling feed material flow through the pyrolysis unit 14 in the direction 17 illustrated in FIG. 1 for example: an air-lock style feeder to deliver it to an optimum point within the pyrolysis unit 14. In any case, exhaust gas from the pre-heater 48, the feed material distribution unit 44 and the feed material container 40 is routed to the exhaust processing system 28 illustrated in FIG. 1.

Figure 3:
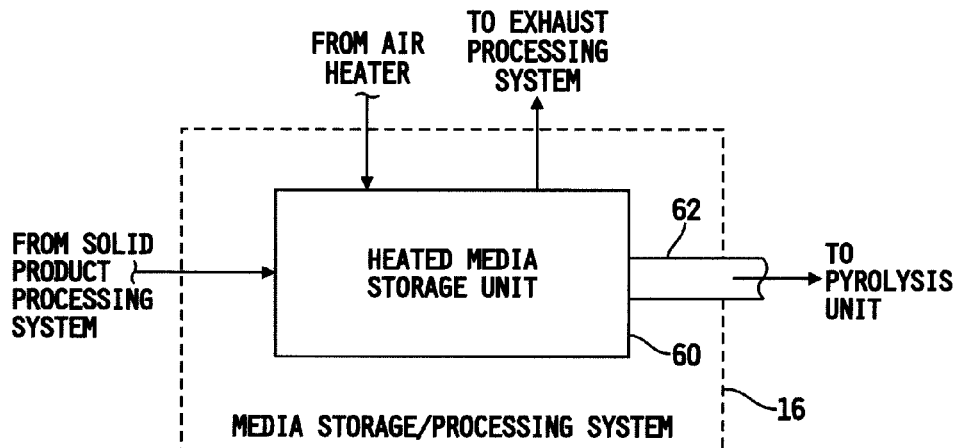
FIG. 3 is a block diagram of one illustrative embodiment of the media storage/processing system illustrated in FIG. 1.

Referring now to FIG. 3, one illustrative embodiment of the media storage/processing system 16 illustrated in FIG. 1 is shown. In the illustrated embodiment, the system 16 includes a heated media storage unit 60 configured to heat media housed therein, and to provide the heated media to the pyrolysis unit 14 via a conventional auger 62. Illustratively, heated air is supplied to the media storage unit 60 by the gas-fueled air heater 22 as described hereinabove, and in one embodiment the heated air supplied to the media storage unit 60 is controlled to maintain the media at approximately 1100 degrees C. prior to passage of the media to the pyrolysis unit 14. In alternative embodiments, the media may be controlled to greater or lesser temperatures. In other embodiments, the media contained within the storage unit 60 may be alternatively or additionally heated using other conventional heat sources. Media recovered by the solid product processing system 26 from solid fuel produced by the pyrolysis unit 14 is supplied to a media inlet conduit coupled between the heated media storage unit 60 and the solid product processing unit 14. In any case, exhaust gas from the media storage unit 60 is routed to the exhaust processing system 28 illustrated in FIG. 1.

Figure 4:
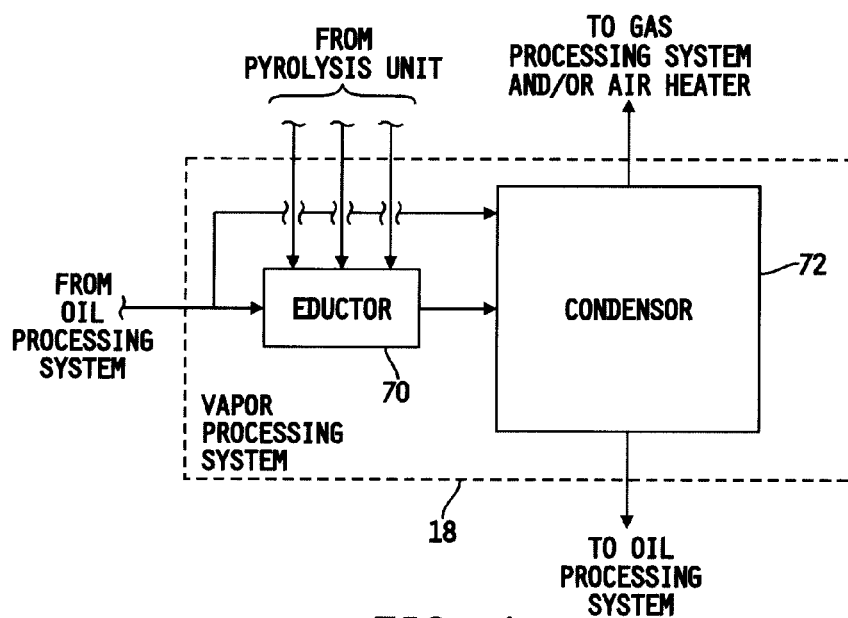
FIG. 4 is a block diagram of one illustrative embodiment of the vapor processing system illustrated in FIG. 1.

Referring now to FIG. 4, one illustrative embodiment of the vapor processing system 18 illustrated in FIG. 1 is shown. In the illustrated embodiment, the system 18 includes a conventional eductor 70 that receives vapor/gas from the pyrolysis unit 14 via the three vapor/gas lines $15_1$-$15_3$ illustrated in FIG. 1, and that also receives oil from the oil processing system 24. An outlet of the eductor 70 is provided to one inlet of a condenser 72, and another inlet of the condenser receives oil from the oil processing system 24. Operation of the eductor is conventional in that a vacuum is created by the oil flow that causes vapor/gas from one or more of the lines $15_1$-$15_3$ to be drawn into the condenser. In one illustrative embodiment, the condenser 72 is cylindrical and the vapor processing system 18 includes three eductors 70 spaced substantially equidistant from each other about the condenser 72, although this disclosure contemplates other embodiments in which the condenser 72 is not cylindrical in shape and/or in which the system 18 includes more or fewer eductors 70. In any case, gas, e.g., hydrogen, exits from the condenser 72 from a top thereof and oil collects in, and exits from the bottom of the condenser 72.

Referring now to FIG. 5, one illustrative embodiment of the gas processing system 20 and the gas-fueled air heater 22 illustrated in FIG. 1 is shown. In the illustrated embodiment, the gas processing system 20 includes a conventional gas blower 80 having an inlet that receives the gas fuel exiting the cylinder 72, and an outlet that supplies the gas to a fuel inlet of a conventional gas burner 86 that forms part of the gas-fueled air heater 22. In some embodiments in which it is desirable to collect and store at least some of the gas fuel exiting the condenser 72, the inlet of the gas blower 80 may also be connected via a conventional valve, V, to a gas storage unit 84.

The gas burner of the gas-fueled air heater 22 has another inlet that receives ambient air provided by a conventional ambient air blower 88. The gas/air mixture is controlled in a conventional manner to provide a gas mixture that is burnable by the gas burner, and heat generated by burning of the gas mixture is used to heat ambient air supplied by the ambient air blower 88 to another air inlet of the gas burner 86. Heated air exits the gas burner 86, and is supplied to several of the systems of the pyrolysis system 10 as illustrated in FIG. 1. In one embodiment, the gas burner 86 is configured and/or controlled to heat the air supplied by the ambient air blower 88 such that the heated air exiting the gas burner 86 is approximately 1100 degrees C., although this disclosure contemplates embodiments in which the gas burner is configured and/or controlled to alternatively provide heated ambient air having higher or lower temperature. In any case, exhaust gas from the gas burner 86 is routed to the exhaust processing system 28 illustrated in FIG. 1.

Referring now to FIG. 6, one illustrative embodiment of the oil processing system 24 illustrated in FIG. 1 is shown. In the illustrated embodiment, the oil processing system 22 includes a conventional fluid pump 90 having an inlet that is connected to an oil outlet of the condenser 72 and an outlet that is connected to an inlet of a conventional oil filter. The pump 90 draws oil from the condenser 72 and directs the drawn oil through the filter 92 to a number, M, of conventional heat exchangers $94_1$-$94_M$, for cooling of the oil exiting the condenser 72, where M may be any positive integer. Alternatively the filter 92 may be bypassed, or the system 24 may be configured to provide for selective bypassing of the filter 92.

In one illustrative embodiment, the system 24 includes two such heat exchangers, although other embodiments are contemplated in which more or fewer heat exchangers may alternatively be used. In any case, each heat exchanger $94_1$-$94_M$ has a water supply inlet connected to a supply of water (not shown) via a corresponding pump, P1-PM, and a water supply outlet connected back to the supply of water. The operation of each heat exchanger, $94_1$-$94_M$, is conventional in that oil passing through the heat exchanger is cooled by water circulated through the heat exchanger by the corresponding pump. An oil outlet of the last heat exchanger $94_M$ is connected to an oil inlet of a number, N, of oil storage units $96_1$-$96_N$, where N may be any positive integer. Oil outlets of the oil storage units $96_1$-$96_N$ are connected to one or more external oil storage units (not shown) via one or more conventional pumps OP1-OPN. At least one of the oil pumps, e.g., OP1, supplies oil to the vapor processing system 18 illustrated and described hereinabove with respect to FIG. 4.

Figure 7:
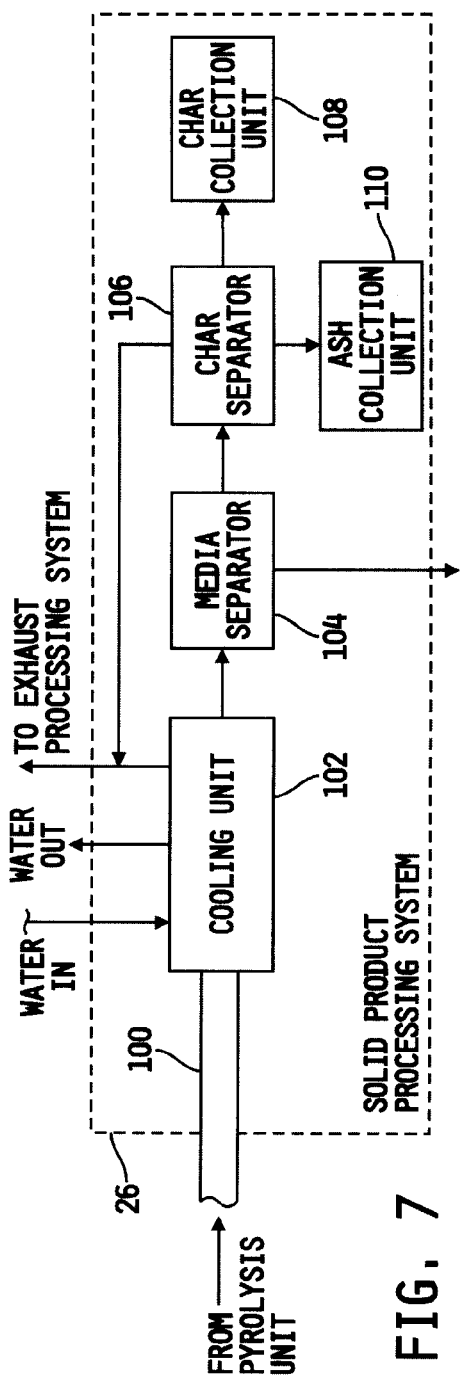
FIG. 7 is a block diagram of one illustrative embodiment of the solid product processing system illustrated in FIG. 1.

Referring now to FIG. 7, one illustrative embodiment of the solid product processing system 26 illustrated in FIG. 1 is shown. In the illustrated embodiment, the solid product processing system 26 includes a conventional auger 100 positioned between a product outlet defined on an underside of the pyrolysis unit 14 and an inlet of a conventional char cooling unit 102. The cooling unit 102 is illustratively made up of one or more conventional heat exchangers that cool the solid product exiting the pyrolysis unit 14 by circulating water therethrough from a source of water (not shown). Exhaust gas resulting from this cooling process is routed to the exhaust processing system 28 illustrated in FIG. 1. A solid product outlet of the cooling unit 102 is coupled to an inlet of a media separator that is operable to separate the media from the solid product. In one embodiment, the media separator is provided in the form of a conventional magnetic separator that is operable to separate metallic media from the solid product. In alternative embodiments, other conventional media separation devices may be alternatively or additionally used. In any case, the separated media exits one outlet of the media separator 104 and is routed back to the media storage unit 60 as illustrated and described hereinabove with respect to FIG. 3. The resulting solid product advances from another outlet of the media separator to a conventional char separator 106 that is configured to separate char, i.e., charcoal fuel, from ash. The separated char is provided to a char collection unit 108, and the separated ash is provided to an ash collection unit 110. In one embodiment, the char separator 106 is provided in the form of a conventional particle size screen, although other embodiments are contemplated in which the char separator is alternatively or additional provided in other conventional forms. Examples of such other conventional forms include, but should not be limited to, a conventional centrifugal classification unit, a conventional eddy current separation unit, a conventional air classification unit and a conventional sink-float fluid media separation unit.

Figure 8:
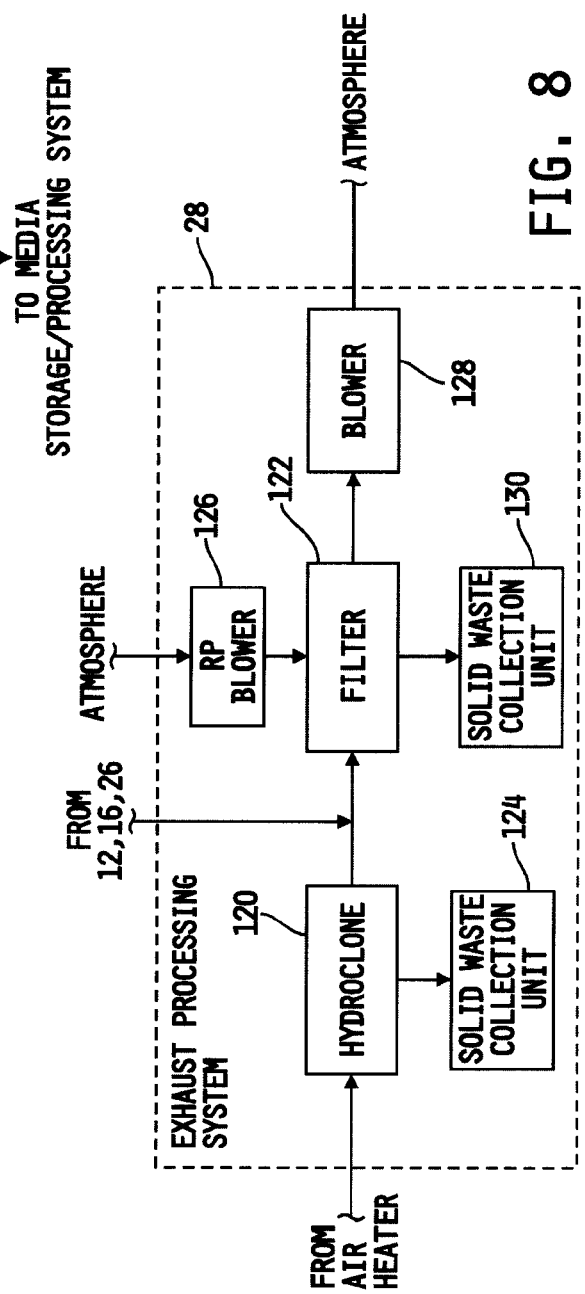
FIG. 8 is a block diagram of one illustrative embodiment of the exhaust processing system illustrated in FIG. 1.

Referring now to FIG. 8, one illustrative embodiment of the exhaust processing system 28 illustrated in FIG. 1 is shown. In the illustrated embodiment, the exhaust processing system 28 includes a conventional hydroclone 120 having an exhaust inlet that receives exhaust from the gas-fueled air heater 22 as described hereinabove. Operation of the hydroclone 120 is conventional in that the hydroclone 120 is operable to separate heavier components, e.g., particulate matter, from the exhaust gas. The separated heavier components exit one outlet of the hydroclone 120 and are provided to a solid waste collection unit 124. The exhaust gas exiting another outlet of the hydroclone 120 is provided, along with the exhaust gas exiting the feed material pre-processing system 12, the media storage/processing system 16 and the solid product processing system 26, to an exhaust inlet of a conventional exhaust filter. In one embodiment, the filter 122 is a conventional bag filter, and a conventional reverse pressure blower 126 is coupled to another inlet of the filter 122 and a conventional blower 128 is coupled between an outlet of the filter 122 and atmosphere. Solid matter collected by the filter 122 is provided to a solid waste collection unit, and the filtered exhaust air exits via the blower 128 to atmosphere. In alternate embodiments, the filter may be or include one or more other conventional exhaust filters.

Figure 9:
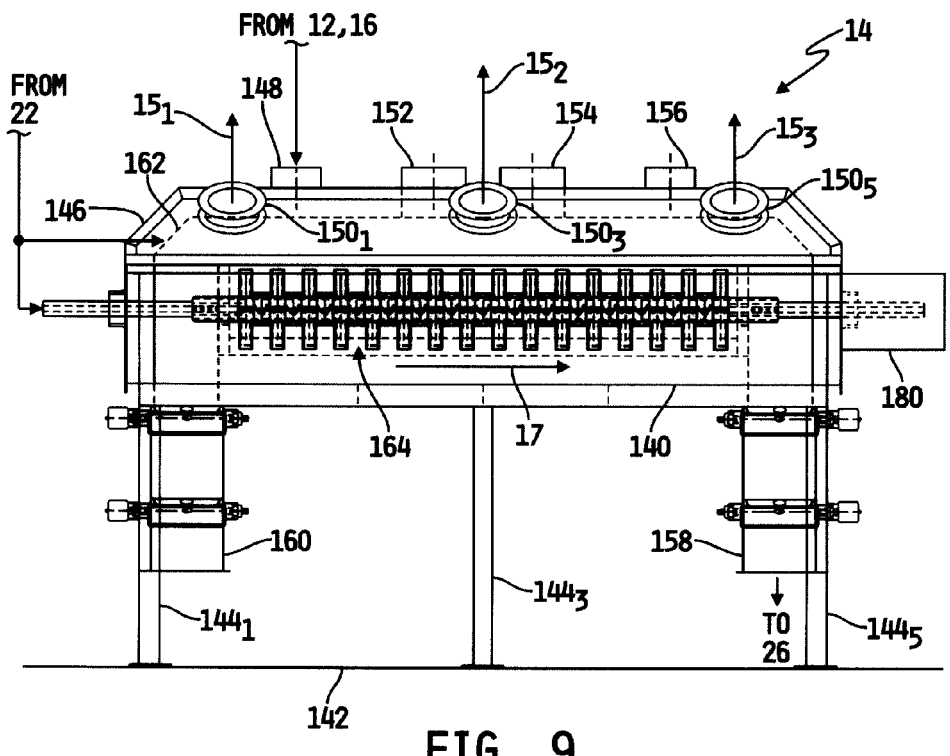
FIG. 9 is a side elevational view of one illustrative embodiment of the pyrolysis unit illustrated in FIG. 1.
Figure 10:
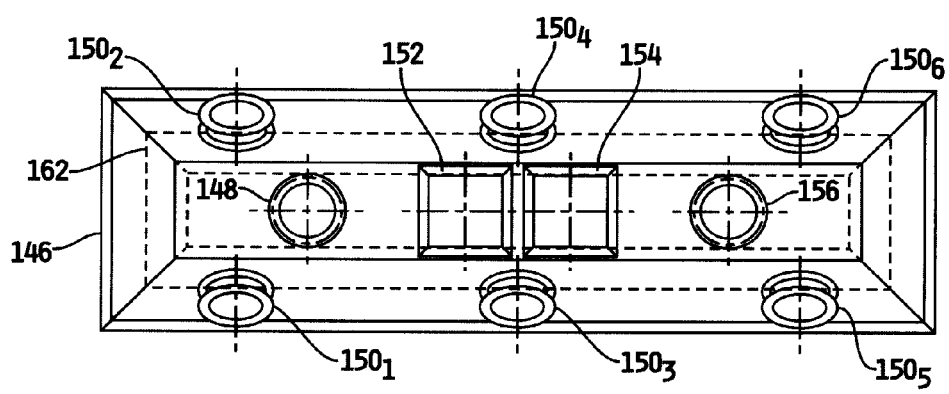
FIG. 10 is a top plan view of the top cover of the pyrolysis unit illustrated in FIG. 9.

Referring now to FIGS. 9-13, various views of one illustrative embodiment of the pyrolysis unit 14 are shown. In the illustrated embodiment, the pyrolysis unit 14 has a five-sided base unit 140 that is resting upon a support surface 142 and that is supported above the support surface 142 by a number of legs. In one illustrative embodiment, six such legs support the base unit 140, e.g., two at one end, two at the other end two in the middle, although only three such legs $144_1$, $144_3$ and $144_5$ are shown in FIG. 9. A top or cover 146 fits over the base unit 140, and the area between the base unit 140 and the cover 146 defines a reaction chamber 162 within the pyrolysis unit 14. The cover 146 defines therein a feed material and media inlet 148 adjacent one end of thereof, and also a number of gas or vapor ports, $150_1$-$150_6$. Cross pairs of the gas/vapor ports, $150_1$-$150_6$, are coupled together via corresponding ones of the gas/vapor transport conduits $15_1$-$15_3$ such that the gas/vapor transport conduit $15_1$ is fluidly coupled between the vapor/gas exit ports $150_1$, $150_2$ and the condenser 72 of the vapor processing system 18, the gas/vapor transport conduit $15_2$ is fluidly coupled between the vapor/gas exit ports $150_3$, $150_4$ and the condenser 72 and the gas/vapor transport conduit $15_3$ is fluidly coupled between the vapor/gas exit ports $150_5$, $150_6$ and the condenser 72. The cover 146 further defines a number of additional ports 152, 154 and 156 therethrough which, for purposes of this description, are sealed.

The base unit 140 further defines a solid product outlet port 158 extending from its bottom surface adjacent an end of the base unit 140 that is opposite the end at which, or near which, the feed material/media inlet 148 is located. In the illustrated embodiment, the opposite end of the base unit 140 defines a second solid product exit port 160 which, for purposes of this description, is sealed. Illustratively, the cover 146 is provided with material inlet ports 148 and 156 at or near opposite ends thereof and the base unit 140 is provided with solid material outlet ports 158 and 160 at opposite ends thereof so that the pyrolysis unit 14 may be configured for material flow along its length in either direction, although in any installation one of the ports 148/156 and a corresponding one of the ports 158,160 will typically be sealed. In the embodiment illustrated in FIG. 9, the direction of material flow within the pyrolysis unit 14 is indicated by the arrow 17.

As described briefly hereinabove with respect to FIG. 1, the pyrolysis unit 14 includes a material backflow apparatus 164 that is configured to controllably impede the flow of material through the unit 14 in the direction 17. The backflow apparatus 164 may be provided in the form of one or more rotatable shafts having a number of mixing members extending therefrom, and in the embodiment illustrated in FIGS. 9-13, the backflow apparatus 164 is provided in the form of two rotatable shafts 170 and 174 that both extend in side-by-side relationship along the length of the reaction chamber 162. The shaft 170 has a number of mixing members, e.g., paddles, 172 extending radially therefrom along a major portion of its length, and the shaft 174 likewise has a number of mixing members, e.g., paddles, 176 extending radially therefrom along a major portion of its length such that the paddles 172 and the paddles 176 mesh together like gears without touching each other. The shaft 170 is controllably driven by a conventional auger drive unit 180 and the shaft 174 is likewise controllably driven by a conventional auger drive unit 182. Illustratively, the paddles 172 extend from the shaft 170 at one angle which, when the shaft is rotationally driven in one direction, provide a backflow or back stirring motion that impedes the flow of material through the unit 14 in the direction of the arrow 17 and that also agitates, e.g., mixes, the material in the unit 14, and the paddles 176 extend from the shaft 174 at another angle which, when the shaft 174 is rotationally driven in a direction that is opposite to that of the shaft 170, also provides backflow or back stirring motion that impedes the flow of material through the unit 14 in the direction of the arrow 17 and that also agitates, e.g., mixes, the material in the unit 14. When the shaft 170 is driven in one direction and the shaft 174 is driven in the opposite direction, the paddles 172 and 176 thus cooperate to provide an overall backflow or back stirring motion that impedes the flow of material through the unit 14 in the direction of the arrow 17 that also agitates, e.g., mixes the material in the unit 14.

Figure 12:
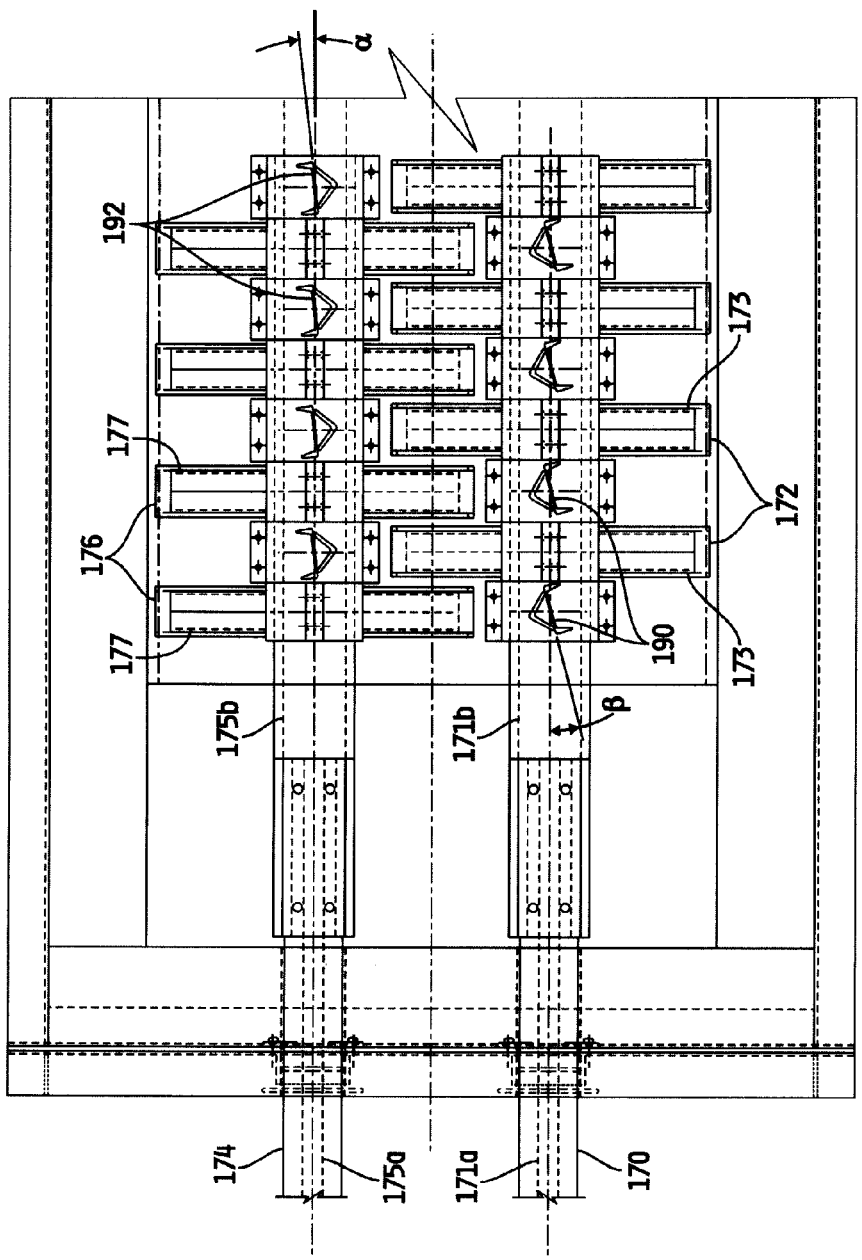
FIG. 12 is a top plan view of the backflow apparatus of FIG. 11 illustrating attachment of the mixing paddles to the rotating shafts of the apparatus.

Referring to FIG. 12, for example, one illustrative embodiment of the backflow apparatus is shown in which the paddles 172 are mounted to the shaft 170 via mounting structures 190 such that the paddles 172 extend from the shaft 170 at an angle, $\beta$, relative to the longitudinal axis if the shaft 170, and the paddles 176 are mounted to the shaft 174 via mounting structures 192 such that the paddles 176 extend from the shaft 174 at an angle, $\alpha$, relative to the longitudinal axis of the shaft 174. In the illustrated embodiment, $\alpha$=approximately 15 degrees relative to the rotational axis of the shaft 170 and $\beta$=approximately 5 degrees relative to the rotational axis of the shaft 174, although other angles of the paddles 172 and/or 176 are contemplated. In any case, the shafts 170 and 174 illustratively have rotational speeds that can be controlled to thereby control impeding force applied by the paddles 172, 176 to the material, and therefore the dwell time of the material in any one or more of the zones of the pyrolysis unit 14.

As also described briefly described hereinabove, heated air from the gas-fueled air heater 22 is supplied to the lining of the reaction chamber 164 and also to the backflow apparatus 164. In the illustrated embodiment, the shafts 170 and 174 each define a fluid flow path therethrough to each of the paddles 172 and 176 respectively, and each paddle 172, 176 defines one or more orifices on one or both sides thereof from which the heated air provided by the air heater 22 to the shafts 170, 172 can exit. Heated air is thereby injected, substantially uniformly, into the material flowing through the pyrolysis unit 14.

Figures 11, 13:
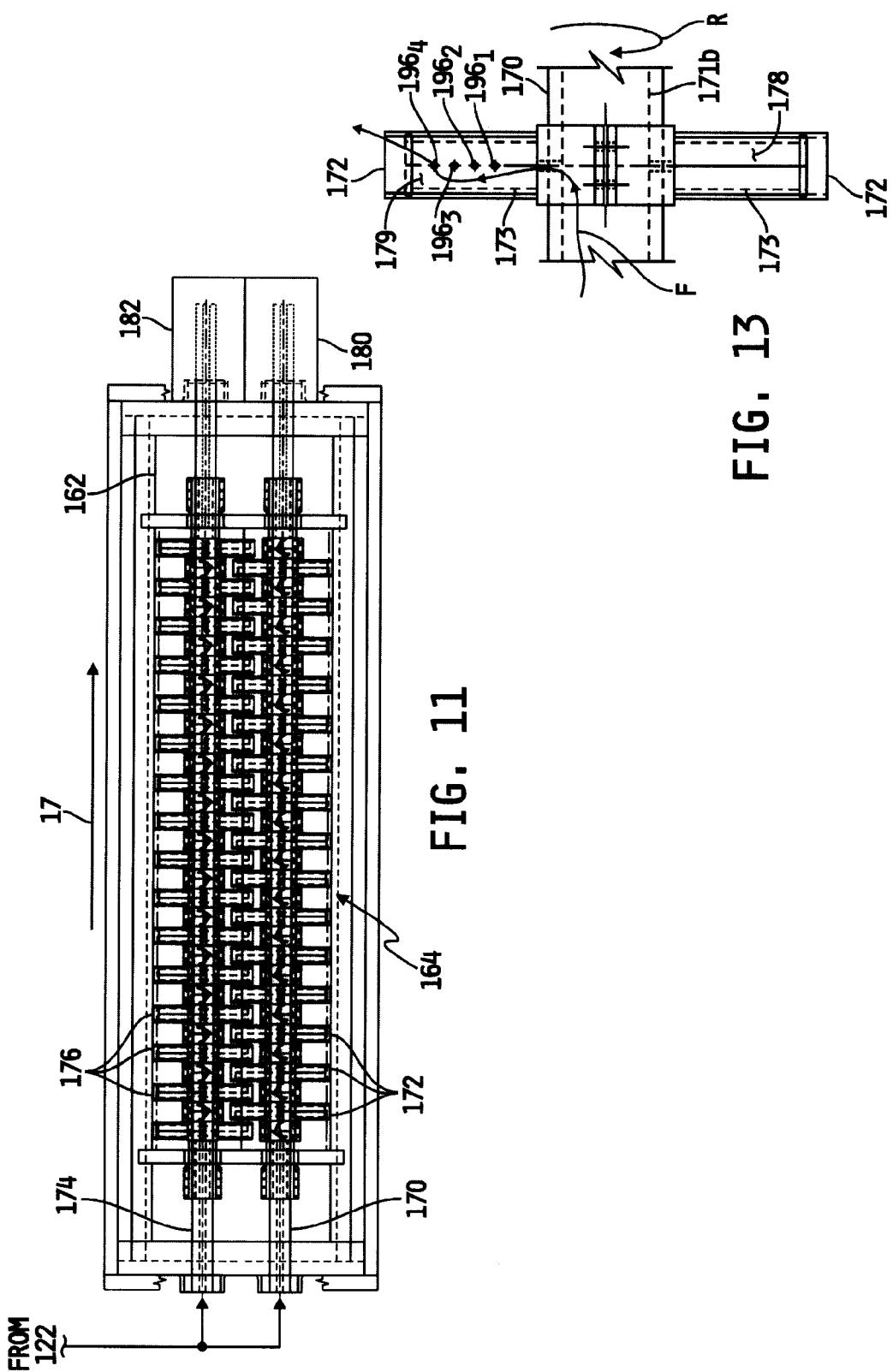
FIG. 11 is a top plan view of the backflow apparatus of the pyrolysis unit illustrated in FIG. 9.
FIG. 13 is a side elevational view of some of the details of the mixing paddles.

As illustrated in detail in FIG. 12, the shaft 170 defines a fluid passageway 171a and 171b centrally therethrough, and each of the paddles 172 likewise define air passageways 173 therethrough. The shaft 174 similarly defines a fluid passageway 175a and 175b centrally therethrough, and each of the paddles 176 likewise define air passageways 177 therethrough. FIG. 13 shows a side view of two of the paddles 172 that rotate in the direction R about the rotating shaft 170. The fluid passageway 171b is fluidly coupled to the fluid passageway 173 defined through each paddle 172. Each paddle 172 defines a front side 178 and a back side 179, wherein the front side 178 is the surface that contacts the components being mixed in the unit 14 and the back side 179 trails the front side 178 as the paddles 172 rotate in the direction R. In the illustrated embodiment, each paddle 172 defines a number of orifices in the back side 179 thereof so that a fluid flow path is created through the fluid passageway 171b, through the fluid passageway 173 and out of at least one of the orifices formed through the back side 179 of the paddle 172. In the embodiment illustrated in FIG. 13, four such orifices $196_1$-$196_4$, are defined in a linear pattern with the first orifice $196_1$ positioned closest to the rotating shaft 170 and the last orifice $196_4$ positioned furthest from the rotating shaft 170. Further in this particular embodiment, the orifices $196_1$-$196_3$ are illustratively plugged such that fluid passing through the fluid passageways 171b and 173 pass only through the single orifice $196_4$ via the fluid flow path F illustrated in FIG. 13. Illustratively, the fluid passing through the various passageways of the backflow apparatus 164 is heated air provided by the gas-fueled air heater 22 as described above, although this disclosure contemplates that other fluids may be passed through the paddle orifices, such as one or more other gases and/or mixtures of gases, one or more liquids and/or mixtures of liquids and/or a combination thereof, wherein any such fluids may be controlled to any desired temperature, and wherein any liquids may be provided in the form of solutions of desired chemical components.

In this illustrative embodiment, the paddles 176 extending from the shaft 174 define identical orifices. It will be understood, however, that FIG. 13 illustrates by way of example only one specific orifice arrangement, and that this disclosure contemplates that one or more fluid flow orifices may be alternatively or additionally defined on either one or both of the front and back sides of any one or more of the various paddles 172/176, and that any such one or more fluid flow orifices may be arranged in any desired pattern and/or location relative to the paddles. It will further be understood that different paddles may alternatively or additionally define more, fewer and/or different orifices than others. As one example, the orifices defined by the paddles 172 and 176 may be defined to provide for different temperature operation in any two or more of the operational zones of the pyrolysis unit 14. Additionally or alternatively, the system 10 may be configured to mix one or more liquids or liquid solutions with the material being processed in any one or more of the operational zones of the unit 14. Alternatively or additionally still, electrical wires may be routed via the above-described fluid passageways to one or more of the paddles 172 and/or 176 in any one or more of the operational zones of the unit 14. In this embodiment, control signals may be supplied via such electrical wires to one or more conventional temperature control mechanisms associated with the paddles, e.g., resistance heaters or the like, to provide for alternate or additional temperature control in any one or more of the operational zones of the unit 14.

The efficiency and yield of the pyrolysis system 10 illustrated and described herein are advanced through the use of one or more of the dual, counter-rotating shafts 170, 172, the stirred-bed of the reactor chamber 162, the plug flow design for advancement of material within the unit 14, the material agitators incorporating heated air injection orifices, and the use of zonal distribution of heat to the lining of the reaction chamber 162.

The following process parameters, either alone or in any combination thereof, may be modified to thereby emphasize the percentage production of gas, oil or char produced by the pyrolysis system 10: (1) the rotational speed of the rotating shafts 170, 172, (2) the temperature of the heated air injected by the shafts/paddles into the reaction chamber 162, (3) the volume of heated air supplied to the reaction chamber 1632, (4) the rate at which feed material is introduced into the pyrolysis unit 14, (5) the temperature of the feed material supplied to the pyrolysis unit 14, (6) the temperature of the media supplied to the pyrolysis unit 14, (7) the rate at which the media is introduced into the pyrolysis unit 14, (8) the temperature of the lining of the reaction chamber 162, (9) the zonal distribution of temperature to the lining of the reaction chamber 162, (10) the zonal distribution of temperature within the reaction chamber 162, and (11) the oxygen content of air entering the reaction chamber 162.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A pyrolysis system for producing at least one of a solid, gaseous and liquid fuel, comprising:
   a source of feed material having carbon and hydrogen bonds,
   a feed material transport system, and
   a pyrolysis unit configured to rest upon a support surface and having a feed material inlet coupled by the feed material transport system to the source of feed material, the pyrolysis unit defining therein a reaction chamber having a length and having the feed material inlet defined at one end thereof, the reaction chamber defining a material flow axis in the reaction chamber from the feed material inlet along its length that is oriented one of parallel to and at an acute angle relative to the support surface, the pyrolysis unit defining at least one outlet for extraction of at the least one of a solid, gaseous and liquid fuel from the reaction chamber, the feed material transport system to force feed the feed material from the source of feed material into the feed material inlet of the reaction chamber and through the reaction chamber such that a flow of material through the reaction chamber from the feed material inlet toward the at least one outlet is controlled by the feed material transport system.

2. The pyrolysis system of claim 1 wherein the feed material transport system comprises an auger to force feed the feed material into the feed material inlet of the reaction chamber according to a plug flow model, wherein the material flow through the reaction chamber from the feed material inlet toward the at least one outlet is controlled by action of the auger.

3. The pyrolysis system of claim 1 further comprising a feed material pre-heating unit positioned between the source of feed material and the feed material inlet of the reaction chamber, the feed material pre-heating unit configured to receive a flow of heated air to control a moisture content of the feed material,
   wherein the feed material transport system comprises a conveyor coupled to the source of feed material, the conveyor to transport the feed material through the feed material pre-heating unit prior to being force fed by the feed material transport system into the feed material inlet of the reaction chamber.

4. The pyrolysis system of claim 1 further comprising a source of sorbent material connected to the source of feed material, the sorbent material being introduced into the feed material prior to the feed material being force fed by the feed material transport system into the feed material inlet of the reaction chamber, the sorbent material sequestering or absorbing one or more acid gas precursors in the feed material.

5. The pyrolysis system of claim 1 further comprising a material backflow apparatus positioned within the reaction chamber to controllably impede the material flow through the reaction chamber from the feed material inlet toward the at least one outlet.

6. The pyrolysis system of claim 5 wherein and the reaction chamber comprises a plurality of zones sequentially along the material flow axis of the reaction chamber,
   and wherein the at least one outlet for extraction of at the least one of a solid, gaseous and liquid fuel from the reaction chamber includes a plurality of gas outlets along the material flow axis of the reaction chamber each for extraction of gaseous fuel from a corresponding one of the plurality of zones of the reaction chamber,
   and wherein the material backflow apparatus controllably impedes the material flow through the reaction chamber to control a dwell time of material in at least one of the plurality of zones.

7. The pyrolysis system of claim 6 wherein the at least one outlet for extraction of at the least one of a solid, gaseous and liquid fuel from the reaction chamber further includes a solid material outlet, for extraction of solid material from the reaction chamber, adjacent to an end of the reaction chamber opposite to the end of the reaction chamber at which the feed material inlet is defined.

8. A pyrolysis system for producing at least one of a solid, gaseous and liquid fuel, comprising:

a source of feed material having carbon and hydrogen bonds, a pyrolysis unit defining therein a reaction chamber having a length and defining a material flow axis along the length from one end of the reaction chamber to an opposite end thereof, the reaction chamber defining a feed material inlet at the one end thereof and at least one outlet for extraction of the at least one of a solid, gaseous and liquid fuel from the reaction chamber, a feed material transport system to force feed the feed material from the source of feed material into the feed material inlet of the reaction chamber and through the reaction chamber such that a flow of material through the reaction chamber in a direction of material flow from the one end of the reaction chamber to the opposite end is controlled by the feed material transport system, and a material backflow apparatus positioned within the reaction chamber to controllably impede material flow through the reaction chamber in the direction of material flow.

9. The pyrolysis system of claim 8 wherein the feed material transport system comprises an auger to force feed the feed material into the feed material inlet of the reaction chamber according to a plug flow model, wherein the material flow through the reaction chamber from the feed material inlet toward the at least one outlet is controlled by action of the auger.

10. The pyrolysis system of claim 8 wherein and the reaction chamber comprises a plurality of zones sequentially along the length and the material flow axis of the reaction chamber, and wherein the at least one outlet for extraction of at the least one of a solid, gaseous and liquid fuel from the reaction chamber includes a plurality of gas outlets along the length and the material flow axis of the reaction chamber each for extraction of gaseous fuel from a corresponding one of the plurality of zones of the reaction chamber, and wherein the material backflow apparatus controllably impedes the material flow through the reaction chamber to control a dwell time of material in at least one of the plurality of zones.

11. The pyrolysis system of claim 8 wherein the material backflow apparatus comprises:

a first rotatable shaft having a first plurality of mixing members extending radially therefrom along the first rotatable shaft, the first rotatable shaft oriented to rotate in a first direction about a first rotational axis that is parallel with the material flow axis, and a first drive unit to rotatably drive the first rotatable shaft about the first rotational axis, wherein the first plurality of mixing members are arranged relative to the first rotatable shaft to mix the material within the reaction chamber and to create a backflow of the material in a backflow direction that is opposite to the direction of material flow when the first rotatable shaft is rotatably driven by the first drive unit to thereby impede the material flow in the direction of material flow.

12. The pyrolysis system of claim 11 wherein the material backflow apparatus comprises:

a second rotatable shaft having a second plurality of mixing members extending radially therefrom along the second rotatable shaft, the second rotatable shaft oriented to rotate in a second direction, opposite the first direction, about a second rotational axis that is parallel with the material flow axis, and a second drive unit to rotatably drive the second rotatable shaft about the second rotational axis, wherein the second plurality of mixing members are arranged relative to the second rotatable shaft to mix the material within the reaction chamber and to create the backflow of the material in the backflow direction when the second rotatable shaft is rotatably driven by the second drive unit to thereby impede the material flow in the direction of material flow.

13. The pyrolysis system of claim 12 wherein the first and second rotatable shafts are arranged side-by-side in the reaction chamber, and wherein the first plurality of mixing members mesh, without contacting, with the second plurality of mixing members.

14. The pyrolysis system of claim 12 wherein the first plurality of mixing members comprise a first plurality of paddles each extending radially away from the first rotatable shaft at a first angle relative to a longitudinal axis of the first rotatable shaft, and wherein the second plurality of mixing members comprise a second plurality of paddles each extending radially away from the second rotatable shaft at a second angle relative to a longitudinal axis of the second rotatable shaft, the second angle different from the first angle.

15. A pyrolysis system for producing at least one of a solid, gaseous and liquid fuel, comprising:

a source of feed material having carbon and hydrogen bonds, a pyrolysis unit defining therein a reaction chamber defining a material flow axis from one end of the reaction chamber to an opposite end thereof, the reaction chamber defining a feed material inlet at the one end thereof and at least one outlet for extraction of the at least one of a solid, gaseous and liquid fuel from the reaction chamber, a feed material transport system to force feed the feed material from the source of feed material into the feed material inlet of the reaction chamber such that a flow of material through the reaction chamber in a direction of material flow from the one end of the reaction chamber to the opposite end is controlled by the feed material transport system, a rotatable shaft having a plurality of mixing members extending radially therefrom along the rotatable shaft, the rotatable shaft oriented to rotate about a rotational axis that is parallel with the material flow axis, the plurality of mixing members arranged relative to the rotatable shaft to mix the material within the reaction chamber and to create a backflow of the material in a backflow direction that is opposite to the direction of material flow when the rotatable shaft is rotatably driven about the rotational axis to thereby impede the material flow in the direction of material flow, and a heating unit to supply heated air to a lining of the reaction chamber and to the rotatable shaft.

16. The pyrolysis system of claim 15 wherein the plurality of mixing members comprise a plurality of paddles each extending radially outwardly from the rotatable shaft at an angle relative to a longitudinal axis of the rotatable shaft.

17. The pyrolysis system of claim 15 wherein the plurality of mixing members each define a number of orifices therein, and wherein the rotatable shaft comprises a first fluid flow path having a fluid inlet fluidly coupled to the heating unit to receive heated air therein, and wherein the plurality of mixing members each comprise a second fluid flow path having a fluid inlet fluidly coupled to the first fluid flow path and a fluid outlet fluidly coupled to at least one of the number of orifices defined therein, and wherein heated air supplied by the heating unit passes through the first and second fluid flow paths and out of the at least one of the number of orifices defined in each of the plurality of mixing members to thereby heat the material in the reaction chamber when mixing the material within the reaction chamber.

18. The pyrolysis system of claim 17 wherein each of the plurality of paddles defines a front side that generally faces the one end of the reaction chamber and a back side that generally faces the opposite end of the reaction chamber, and wherein the number of orifices are defined through the back sides of each of the plurality of paddles.

19. The pyrolysis system of claim 17 wherein and the reaction chamber comprises a plurality of zones sequentially along a length of the reaction chamber, from one end of the reaction chamber to an opposite end thereof, and along the material flow axis of the reaction chamber, and wherein the at least one outlet for extraction of at the least one of a solid, gaseous and liquid fuel from the reaction chamber includes a plurality of gas outlets along the length and the material flow axis of the reaction chamber each for extraction of gaseous fuel from a corresponding one of the plurality of zones of the reaction chamber, and wherein rotational speed of the rotatable shaft is controlled to impede the material flow through the reaction chamber to control a dwell time of material in at least one of the plurality of zones.

20. The pyrolysis system of claim 19, wherein each of the plurality of zones of the reaction chamber contains therein a different subset of the plurality of mixing members radially extending from the rotatable shaft, and wherein the number of orifices defined through each of the plurality of mixing members through which the heated air can pass is different for the subset of the plurality of mixing members in at least one of the plurality of zones than for a subset of the plurality of mixing members in at least another of the plurality of zones to provide for different temperature operation in the at least one of the plurality of zones than in the at least another of the plurality of zones.

* * * * *